_United States Patent_ [19]

Kapusciniski et al.

[11] Patent Number: 4,715,975
[45] Date of Patent: Dec. 29, 1987

[54] OIL CONTAINING DISPERSANT VII OLEFIN COPOLYMER

[75] Inventors: Maria M. Kapusciniski, Carmel; Benjamin J. Kaufman, Wappingers Falls; Christopher S. Liu, Poughkeepsie, all of N.Y.

[73] Assignee: Texaco Inc., White Plains, N.Y.

[21] Appl. No.: 642,314

[22] Filed: Aug. 20, 1984

[51] Int. Cl.$^4$ .................... C10M 149/04; C08F 26/02
[52] U.S. Cl. .................................. 252/50; 525/331.7; 525/379; 564/509
[58] Field of Search ............... 252/50; 525/331.7, 379; 564/509

[56] References Cited

U.S. PATENT DOCUMENTS

| | | | |
|---|---|---|---|
| 4,086,299 | 4/1978 | Jackson et al. | 525/293 |
| 4,146,489 | 3/1979 | Stambaugh et al. | 252/50 |
| 4,340,689 | 7/1982 | Joffrion | 252/50 |

_Primary Examiner_—William R. Dixon, Jr.
_Assistant Examiner_—Ellen M. McAvoy
_Attorney, Agent, or Firm_—Robert A. Kulason; James J. O'Loughlin; Carl G. Seutter

[57] ABSTRACT

A VII olefin copolymer, prepared by grafting allyl amine onto EPM or EPT, permits attainment of improved dispersancy and viscosity index in oils.

12 Claims, No Drawings

OIL CONTAINING DISPERSANT VII OLEFIN COPOLYMER

FIELD OF THE INVENTION

This invention relates to hydrocarbon fuels and lubricating oils. More particularly it relates to novel copolymers which may impart viscosity index improvement to lubricating oils and improvement in dispersancy properties to fuels.

BACKGROUND OF THE INVENTION

As is well known to those skilled in the art, hydrocarbon lubricating oils and hydrocarbon fuels are characterized by certain properties typified by dispersancy and, in the case of former, by viscosity index. There is a continuing attempt to improve these properties by developing additives which will effect desired results more efficiently, at lower cost, by use of lesser quantities, etc. It is an object of this invention to provide a novel polymer which may be employed as an additive. Other objects will be apparent to those skilled in the art.

STATEMENT OF THE INVENTION

In accordance with certain of its aspects, this invention may be directed to a graft copolymer comprising an oil-soluble, substantially linear, carbon-carbon backbone polymer, preferably selected from the group consisting of ethylene-propylene copolymers and ethylene-propylene-third monomer terpolymers, said backbone polymer having graft polymerized thereon monomer units derived from $RNH_2$ monomer wherein R is a hydrocarbon containing a polymerizable ethylenically unsaturated double bond.

DESCRIPTION OF THE INVENTION

The charge polymer which may be employed in practice of the process of this invention may include an oil-soluble, substantially linear, carbon-carbon backbone polymer. Typical carbon-carbon backbone polymers bearing an ethylenically unsaturated polymerizable double bond which may be employed include homopolymers or copolymers prepared from monomer

wherein A may be hydrogen; hydrocarbon such as alkyl, aryl, etc.; acyloxy (typified by —COOR); halide; etc. Illustrative of such monomers may be acrylates, methacrylates, vinyl halides (such as vinyl chloride), styrene, and olefins such as ethylene, propylene, butylene, etc. Although homopolymers of olefins (such as polyethylene, polypropylene, polyisobutylene, etc) or copolymers of ethylene with eg butylene and higher olefins may be employed, the preferred carbon-carbon backbone polymers include those selected from the group consisting of ethylene-propylene copolymers (EPM) and ethylene-propylene-third monomer terpolymers (EPDM or EPT).

When the charge polymer is an ethylene-propylene copolymer (EPM), it may be formed by copolymerization of ethylene and propylene under known conditions preferably Ziegler-Natta reaction conditions. The preferred EPM copolymers contain units derived from the ethylene in amount of 40-70 mole %, preferably 50-60 mole %, say 55 mole %, the remainder being derived from propylene.

The molecular weight $\overline{M}_n$ of the EPM copolymers which may be employed may be 10,000-1,000,000, preferably 20,000-200,000, say 80,000. The molecular weight distribution may be characterized by $\overline{M}_w/\overline{M}_n$ of less than about 15, preferably 1.5-10, say 2.

Illustrative EPM copolymers which may be employed in practice of the process of this invention may be those set forth in the following table, the first listed being preferred.

A. The Epsyn 3006 brand of EPM marketed by copolymer Rubber and Chemical Corp. containing 55 mole % of units derived from ethylene and 45 mole % of units derived from propylene and having a $\overline{M}_n$ of 80,000 and a polydispersancy index $\overline{M}_w/\overline{M}_n$ of 1.84;

B. The Epcar 505 brand of EPM marketed by B. F. Goodrich Co. containing 50 mole % of units derived from ethylene and 50 mole % of units derived from propylene and having a $\overline{M}_n$ of 25,000 and a polydispersancy index of 2.5;

C. The Esprene brand of EPR marketed by Sumitomo Chemical Co. containing 55 mole % of units derived from ethylene and 45 mole % of units derived from propylene and having a $\overline{M}_n$ of 25,000 and polydispersancy index of 2.5;

When the charge polymer is a terpolymer of ethylene-propylene-third monomer (EPT or EPDM), it may be formed by copolymerization of ethylene, propylene and third monomer. The third monomer is commonly a non-conjugated diene typified by dicyclopentadiene; 1,4-hexadiene; or ethylidene norbornene. Polymerization is effected under known conditions generally comparable to those employed in preparing the EPM products. The preferred terpolymers contain units derived from ethylene in amount of 40-70 moles %, preferably 50-65 mole %, say 60 mole % and units derived from the propylene in amount of 20-60 mole %, preferably 30-50 mole %, say 35 mole % and units derived from third diene monomer in amount of 2-15 mole %, preferably 5-10 mole %, say 5 mole %. The molecular weight $\overline{M}_n$ of the terpolymers may typically be 10,000-1,000,000, preferably 20,000-200,000, say 80,000. Molecular weight distribution of the useful polymers is preferably narrow viz a $\overline{M}_w/\overline{M}_n$ of typically less than 15, preferably 1.5-10, say 2.

Illustrative EPT terpolymers which may be employed in practice of the process of this invention may be those set forth in the following table, the first listed being preferred:

TABLE

A. The Epsyn 4006 brand of EPT marketed by Copolymer Corp. containing 58 mole % of units derived from ethylene, 40 mole% of units derived from propylene, and 2 mole % of units derived from ethylidene norbornene and having a $\overline{M}_n$ of 120,000 and a polydispersancy $\overline{M}_w/\overline{M}_n$ of 2.2.

B. The Ortholeum 5655 brand of EPT marketed by DuPont containing 62 mole % of units derived from ethylene, 36 mole % of units derived from propylene, and 2 mole % of units derived from 1,4-hexadiene and having a $\overline{M}_n$ of 80,000 and a polydispersancy $\overline{M}_w/\overline{M}_n$ of 2.

C. The Ortholeum 2052 brand of EPT marketed by DuPont containing 62 mole % of units derived from ethylene, 36 mole % of units derived from propylene, and 2 mole % of units derived from 1,4-hexdiene and having a $\overline{M}_n$ of 35,000 and a polydispersancy $\overline{M}_w/\overline{M}_n$ of 2.

D. The Royalene brand of EPT marketed by Uniroyal containing 60 mole % of units derived from ethylene, 37 mole % of units derived from propylene, and 3 mole % of units derived from dicyclopentadiene and having a $\overline{M}_n$ of 100,000 and a polydispersancy $\overline{M}_w/\overline{M}_n$ of 2.5.

E. The Epsyn 40A brand of EPT marketed by Copolymer Corp. containing 60 mole % of units derived from ethylene, 37 mole % of units derived from propylene, and 3 mole % of units derived from ethylidene norbornene and having a $\overline{M}_n$ of 140,000 and a polydispersancy $\overline{M}_w/\overline{M}_n$ of 2.

The EPM and EPT polymers may contain minor portions (typically less than about 30%) of other units derived from other copolymerizable monomers.

The amine monomer which may be grafted onto the EPM of EPT in practice of the process of this invention may be characterized by the formula $RNH_2$ wherein R is a hydrocarbon moiety possessing a polymerizable ethylenically unsaturated double bond. R may be an alkenyl or cycloalkenyl group (including such groups bearing inert substituents) typified by vinyl, allyl, $C=C-C_6H_4-$, etc. Illustrative amines which may be employed include those listed in the following table, the first listed, allyl amine, being preferred.

TABLE $C=C-C-NH_2$
cyclohexen-2-yl amine
p-aminostyrene
p-(aminomethyl)styrene
$C=C-(CH_2)_8 NH_2$(n-decen-9-yl amine)

In practice of the process of this invention 100 parts of charge EPM or EPT may be added to 100–1000 parts, say 300 parts of solvent. Typical solvent may be a hydrocarbon solvent such as n-hexane, n-heptane, tetrahydrofuran, or mineral oil. Preferred solvent may be a commercial hexane containing principally n-hexane isomers. Reaction mixture may then be heated to reaction conditions of 60° C.–180° C., preferably 150° C.–170° C., say 155° C. at 15–300 psig, preferably 180–220 psig, say 200 psig.

Graft monomer, typically allyl amine is admitted in amount of 1–40 parts, say 10 parts, followed by a solution in hydrocarbon of free radical initiator. Typical free radical initiators capable of hydrogen abstraction may include dicumyl peroxide, di-t-butyl peroxide, benzoyl peroxide, di-isopropyl peroxide, azobisisobutyronitrile, etc. The solvent is preferably the same as that in which the EPM or EPT is dissolved. The initiator may be added in amount of 0.2–10 parts, say 4 parts in 0.8–40 parts, say 16 parts of solvent.

The free-radical initiator is admixed with the graft solvent monomer and the polymer at a temperature below the decomposition temperature of the initiator. Typically mixing may be carried out at below about 40° C., say 20° C. to 40° C., say 20° C. The reaction mixture is then raised to a temperature at least as high as the decomposition temperature of the initiator, typically 60° C. or higher.

Reaction is typically carried out at 60° C.–180° C., say 155° C. and 180–220 psig, say 200 psig during which time graft polymerization of the amine onto the base EPM or EPT polymer occurs. The final product graft polymer may be characterized by the presence of the following units:

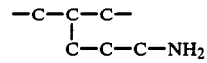

Typically there may be one amine-containing unit per 100–300, say 200 units of the charge backbone polymer.

For ease of handling, the polymerization solvent may be exchanged with a heavier solvent such as SUS 100. Product graft polymer is typically obtained as a solution of 6–12 parts, say 8.5 parts thereof in 88–94 parts, say 91.5 parts of solvent.

It is a feature of this invention that the so-prepared graft polymers may find use in fuel oils as dispersant when present in effective amount of 0.001–2 w%, say 0.5 w%. Typical fuel oils may include middle distillate fuel oils including kerosene, home heating oils, diesel fuel, etc.

It is a feature of this invention that the so-prepared graft polymers may find use in lubricating oils as dispersant, viscosity index improvers when present in effective amount of 0.4–5 w%, preferably 0.6–3 w%, say 0.9 w%.

Lubricating oils in which the dispersant viscosity index improvers of this invention may find use may include automotive, aircraft, marine, railway, etc. oils; oils used in spark ignition or compression ignition; summer or winter oils; etc. Typically the lubricating oils may be characterized by an ibp of 570° F.–660° F., say 610° F.; an ep of 750° F.–1200° F., say 1020° F.; and an API gravity of 25–31, say 29.

A typical lubricating oil in which the polymer of this invention may be present may be a standard SAE 5W-30 hydrocarbon motor oil formulation having the following composition:

TABLE

| | W % |
|---|---|
| Base Oil | 82 |
| Viscosity Index Improver | 9 |
| (10 w % ethylene-propylene copolymer in 90% inert oil) | |
| Standard Additive Package | 9 |
| Polyisobutenyl ($\overline{M}_n$ 1290) succinimide (dispersant and anti-wear); | |
| calcium sulfonate (detergent); | |
| Zinc dithiophosphate (anti-wear); | |
| di-nonyl diphenyl amine (anti-oxidant); | |
| 4,4'-methylene-bis (2,6-di-t-butyl phenol) (anti-wear); | |

Use of the additive of this invention makes it possible to readily increase the viscosity index by 25–40 units, say 35 units and to obtain improved ratings on the tests measuring the dispersancy of the system. The viscosity index is determined by ASTM Test D-445.

Dispersancy is determined by the Bench VC Test (BVCT). In this test, the turbidity of an oil containing an additive is measured after heating the test oil to which has been added a standard blow-by. The result correlates with dispersancy is compared to three standards (Good, Fair, and Poor) tested simultaneously with the test sample. The numerical rating decreases with an increase in dispersant effectiveness. Results lower than that of the Good Reference indicate that the additive is a good candidate.

Practice of the process of this invention will be apparent to those skilled in the art from the following examples wherein, as elsewhere in this specification, all parts are parts by weight unless otherwise set forth. Control examples are designated by an asterisk.

DESCRIPTION OF PREFERRED EMBODIMENTS

EXAMPLE I

In this example which describes the best mode presently known, the charge EPM polymer is the Epsyn brand of polymer of molecular weight $\overline{M}_n$ of 80,000, of $\overline{M}_w/\overline{M}_n$ ratio of 2.0, and containing 55 mole % of units derived from ethylene and 45 mole % of units derived from propylene. 100 parts of this polymer are dissolved in 300 parts of commercial hexane and added to a reaction vessel.

The reaction vessel is purged with nitrogen and heated to 155° C. at 200 psig. Allyl amine (10 parts) is added followed by a solution of 5 parts of dicumyl peroxide initiator in 10 parts of commercial hexane. The mixture is stirred at 155° C. and 200 psig for 1 hour. Solvent Neutral Oil (SUS 100) (1076 parts) is then added; and the hexane is distilled off at 90°–120° C. The resulting solution contains about 8.5 wt% polymer.

The process of Example I may be carried out using the following charge polymers:

| EXAMPLE | |
|---|---|
| II | The Epsyn 4006 brand of EPT marketed by Copolymer containing 58 mole % of units derived from ethylene, 40 mole % of units derived from propylene, and 2 mole % of units derived from ethylidene norbornene and having a $M_n$ of 120,000 and a polydispersancy $\overline{M}_w/\overline{M}_n$ of 2.2. |
| III | The Ortholeum 5655 brand of EPT marketed by DuPont containing 62 mole % of units derived from ethylene, 36 mole % of units derived from propylene, and 2 mole % of units derived from 1,4-hexadiene and having a $\overline{M}_n$ of 80,000 and a polydispersancy $\overline{M}_w/\overline{M}_n$ of 2. |
| IV | The Ortholeum 2052 brand of EPT marketed by DuPont containing 62 mole % of units derived from ethylene, 36 mole % of units derived from propylene, and 2 mole % of units derived from 1,4-hexadiene and having a $M_n$ of 35,000 and a polydispersancy $\overline{M}_w/\overline{M}_n$ of 2. |
| V | The Royalene brand of EPT marketed by Uniroyal containing 60 mole % of units derived from ethylene, 37 mole % of units derived from propylene, and 3 mole % of units derived from dicyclopentadiene and having a $\overline{M}_n$ of 100,000 and a polydispersancy $\overline{M}_w/\overline{M}_n$ of 2.5. |
| VI | The Epsyn 40A brand of EPT marketed by Copolymer containing 60 mole % of units derived from ethylene, 37 mole % of units derived from propylene, and 3 mole % of units derived from ethylidene norbornene and having a $M_n$ of 140,000 and a polydispersancy $\overline{M}_w/\overline{M}_n$ of 2. |

EXAMPLES VII-VIII*-IX*

In experimental Example VII, the oil solution of amine graft copolymer of Example I is added in amount of 10 wt% (corresponding to 0.85 w% of active ingredient) to a fully formulated base blend containing the following components:

TABLE

| Components | W % |
|---|---|
| SNO-7 oil | 75.25 |
| SNO-20 oil | 21.64 |
| Zinc dithiophosphate (anti-wear) | 1.12 |
| Naugalube 438 Brand of 4,4'-di-nonyl-di-phenyl amine | 0.39 |

TABLE-continued

| Components | W % |
|---|---|
| (antioxidant) | |
| Surchem 521 Brand of Mg Sulfonate (detergent) | 1.50 |
| Silicone polymer (anti-foamant) | 150 ppm |

This oil had the following properties:

TABLE

| Property | Value |
|---|---|
| Viscosity Kin 40° C. CS | 31.50 |
| 100° C. CS | 5.36 |
| Pour Point °F. | +5 |
| Ash sulfated % (ASTM D-874) | 0.93 |
| Phosphorus % (X-ray) | 0.11 |
| Sulfur % (X-ray) total | 0.40 |
| Zinc % (X-ray) | 0.12 |
| Magnesium % | 0.33 |
| Cold Cranking Simulator (cP@-18° C.) | 1660 |

In control Example VIII*, the base blend contained 0.85 w% of non-dispersant VI improver. In control Example IX*, the base blend contained 0.85 w% of non-dispersant VI improver plus 1.2 w% standard dispersant.

These three samples were evaluated in the BVCT.

TABLE

| Example | BVCT Rating | Standards Good/Fair/Poor |
|---|---|---|
| VII | 44.4 | 9.06/31.0/61.0 |
| VIII* | 99.3 | 9.0/36.5/66.5 |
| IX* | 40.0 | 9.1/31.0/61.0 |

Viscosity index improvers with good dispersancy properties usually rate at about the same level as the fair standards in the BVCT. From these data, it is apparent that the system of this invention provides superior dispersancy i.e. it receives a rating which is equivalent to that achieved by the system containing the same amount of non-dispersant VI improver plus 1.2 w% standard dispersant.

EXAMPLES X-XI*

In Example X, the product of Example I, containing the amine-grafted EPM, was tested as a viscosity index improver in a conventional mineral lubricating oil at concentration of 11.5 w% (corresponding to 1 w% of grafted EPM); and in control Example XI* (containing 11.5 w% of commercial non-dispersant VI improver—corresponding to 1 w% active ingredient) was tested in the same system.

TABLE

| | Kinematic Viscosity (cSt) | | Thickening Power @ |
|---|---|---|---|
| Example | 40° C. | 100° C. | 100° C. |
| X | 77.8 | 12.8 | 8.0 |
| XI* | 69.0 | 11.5 | 6.7 |

Thickening Power is calculated by subtracting the viscosity of the Base Blend (4.8 cSt @100° C.) from that of the test specimen measured at 100° C. This number (eg 12.8–4.8 or 8.0 in the case of Example X) is the Thickening Power at 100° C.

It is clear that the system of this invention permit attainment of improved Thickening power by a factor of eg 8.0/6.7 or 119%.

Although this invention has been illustrated by reference to specific embodiments, it will be apparent to those skilled in the art that various changes and modifications may be made which clearly fall within the scope of this invention.

What is claimed is:

1. A graft polymer comprising an oil-soluble, substantially linear, carbon-carbon backbone polymer having graft polymerized thereon units derived from allyl amine.

2. A graft polymer as claimed in claim 1 wherein said backbone polymer is a copolymer of ethylene-propylene or of ethylene-propylene third monomer.

3. A graft polymer as claimed in claim 1 wherein the molecular weight $\overline{M}_n$ of said backbone polymer is 10,000–1,000,000.

4. A graft polymer as claimed in claim 1 wherein the molecular weight $\overline{M}_n$ of said backbone polymer is 20,000–200,000.

5. A graft polymer as claimed in claim 1 wherein said graft polymer contains one amine-containing unit per 100–300 units of backbone polymer.

6. A graft polymer comprising an oil-soluble, substantially linear carbon-carbon backbone polymer of molecular weight $\overline{M}_n$ of 10,000–1,000,000, derived from ethylene-propylene or ethylene-propylene-third monomer backbone polymers, said backbone polymer having graft polymerized thereon units derived from allyl amine.

7. A lubricating oil composition containing a major portion of a lubricating oil and a minor effective viscosity-index improving amount of a graft copolymer comprising an oil-soluble, substantially linear, carbon-carbon backbone polymer having graft polymerized thereon units derived from allyl amine.

8. A lubricating oil composition as claimed in claim 7 wherein said backbone polymer is a copolymer of ethylene-propylene or of ethylene-propylene third monomer.

9. A lubricating oil composition as claimed in claim 7 wherein the molecular weight $\overline{M}_n$ of said backbone polymer is 10,000–1,000,000.

10. A lubricating oil composition as claimed in claim 7 wherein the molecular weight $\overline{M}_n$ of said backbone polymer is 20,000–200,000.

11. A lubricating oil composition as claimed in claim 9 wherein said graft polymer contains one amine-containing unit per 100–300 units of backbone polymer.

12. A lubricating oil composition comprising a major portion of a lubricating oil and a minor effective viscosity index-improving amount of 0.4–5 w% of a graft polymer comprising an oil-soluble, substantially linear carbon-carbon backbone polymer of molecular weight $\overline{M}_n$ of 10,000–1,000,000, derived from ethylene-propylene or ethylene-propylene-third monomer backbone polymers, said backbone polymer having graft polymerized thereon units derived from allyl amine.

* * * * *

UNITED STATES PATENT AND TRADEMARK OFFICE
CERTIFICATE OF CORRECTION

PATENT NO. : 4,715,975

DATED : December 29, 1987

INVENTOR(S) : Maria M. Kapuscinski et al.

It is certified that error appears in the above-identified patent and that said Letters Patent is hereby corrected as shown below:

On the title page, first inventor's name should read

-- Maria M. Kapuscinski --.

Signed and Sealed this

Thirtieth Day of August, 1988

Attest:

DONALD J. QUIGG

Attesting Officer

Commissioner of Patents and Trademarks